April 7, 1936. J. I. JOHNSON 2,036,216
POWER TRANSMISSION CHAIN
Filed June 24, 1933
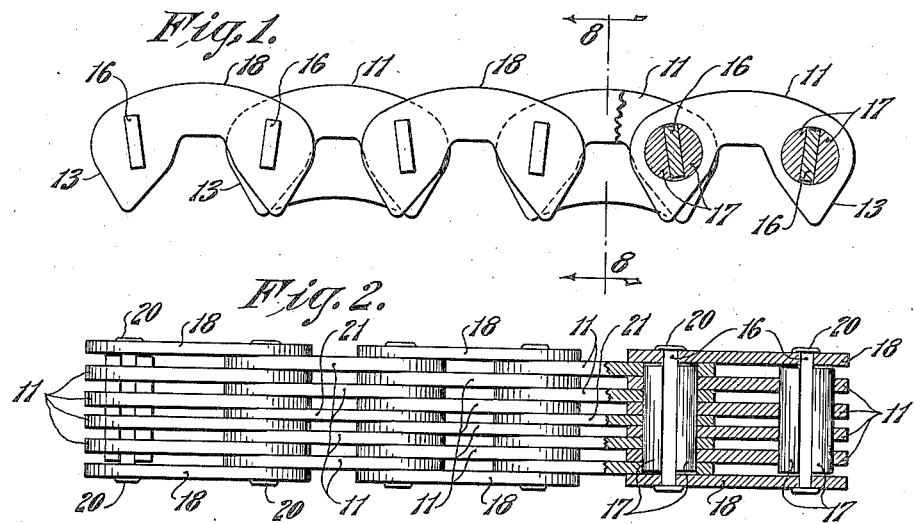
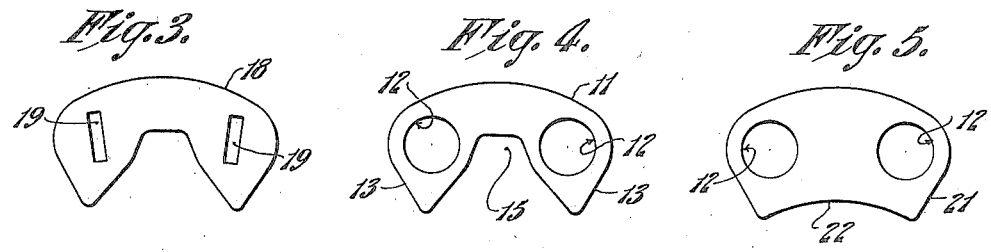
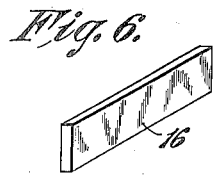 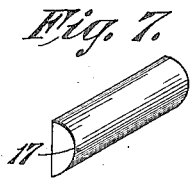 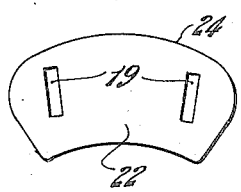
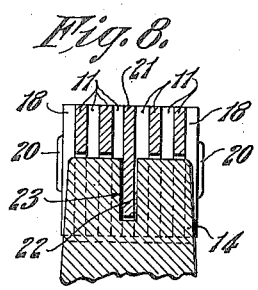 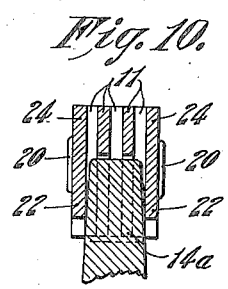
INVENTOR,
John I. Johnson,
BY
Frank E. Haskell
ATTORNEY.

Patented Apr. 7, 1936

2,036,216

UNITED STATES PATENT OFFICE 2,036,216

POWER TRANSMISSION CHAIN

John Iver Johnson, Springfield, Mass.

Application June 24, 1933, Serial No. 677,445

7 Claims. (Cl. 74—251)

This invention relates to power transmission chain and has for one of its objects the production of a chain which will operate with a minimum amount of noise.

Another object of the invention is to provide a chain which will not wear rapidly nor stretch readily during its life. While wear and stretching are both objectionable in themselves they are also objectionable in that they contribute greatly to noise.

A further object of the invention is to produce a chain which is capable of being rolled up into a small size for convenience in packing and shipping.

A still further object of the invention is to provide a chain which will be simple in construction and economical to manufacture.

The foregoing and other objects of the invention will readily appear to those skilled in the art to which it appertains by a consideration of the following description of one embodiment thereof taken in connection with the accompanying drawing in which Fig. 1 is a side elevation, partly broken away, of a chain embodying the invention;

Fig. 2 is a plan of the chain shown in Fig. 1, partly broken away;

Fig. 3 is a side elevation of one of the outside links;

Fig. 4 is a side elevation of one of the driving links;

Fig. 5 is a side elevation of one of the guide links;

Fig. 6 is a perspective view of one of the middle members of the bearing pintle;

Fig. 7 is a perspective view of one of the outside members of the bearing pintle;

Fig. 8 is a vertical section taken on the line 8—8 of Fig. 1 and shows in addition one of the intermeshing sprocket teeth;

Fig. 9 is an elevation of one of the outside links of a modified form of construction; and Fig. 10 is a vertical section, corresponding to Fig. 8, of the modified form of construction.

A plurality of inner links 11, which act as driving links, are each provided with a circular opening or bearing 12 in each end thereof. These links have the usual teeth 13 for engagement with sprocket teeth 14 which sprocket teeth fit into the space 15 between the two teeth 13 of a link. The driving links 11 are assembled so that the circular openings or bearings 12 are in register with each other and the alternate links extend in opposite directions, as clearly seen in Fig. 2.

A three-part bearing pintle is then positioned in the registering openings 12. This pintle comprises a middle member 16 of rectangular cross section and two oppositely disposed members 17, one at each side of the middle member. With the three-part bearing pintle in place its cross section is substantially circular, one surface of each member 17 being cylindrical to fit the bearing 12 and the other side being flat and in contact with one of the flat surfaces of the middle member 16. It will be noted that the width of the rectangular middle member 16 is a little less than the diameter of the opening or bearing 12 so that the member 16 is capable of a slight amount of shifting movement relative to each of the oppositely disposed members 17.

In order to secure the pintle in place, outside links 18 are provided which have a rectangular opening 19 in each end thereof. The ends of the members 16 extend through the openings 19 and are swaged over, as indicated at 20 in Figs. 2 and 8 to hold them in place. It will be noted that the long dimensions of the rectangular openings 19 are substantially at right angles to the direction in which the chain moves when in operation and therefore the slight sliding movement which the member 16 is capable of in operation is substantially at right angles to the longitudinal movement of the chain. This shifting movement takes place chiefly during the passage of the chain around a sprocket and it is therefore desirable that the long dimension of the rectangular opening be at a slight angle or more nearly in the same direction as the radius of the sprocket around which the chain is passing. Fig. 3 shows the openings 19 so arranged.

In order to keep the chain in position on the sprocket teeth there may be provided guide links 21 which do not have the space 15 for the sprocket teeth but are provided with a web 22 which may cooperate with a suitably provided groove in the sprocket teeth. Figs. 2 and 8 show this guide link positioned in the middle of the chain and cooperating with a groove 23 in the middle of one of the sprocket teeth.

A modified form of construction is shown in Figs. 9 and 10 in which an outside link 24 is provided with the rectangular openings 19 and has the guiding web 22. The inner or driving links 11 are assembled to make up a chain equal in thickness to the thickness of the tooth 14a and then the outside links 24 are positioned outside of the links 11, one on each side thereof. In this form of construction the sprocket teeth do not require a groove as the guiding is done against the outside of the teeth as clearly seen in Fig. 10.

It has been proposed heretofore to use a three-part bearing pintle and to have the oppositely disposed members rock against the middle member by means of a knife-edge bearing. Experience indicates, however, that the transverse shifting between the parts of such bearings very rapidly wears away the knife edge and gives rise to lost motion and resultant noisy operation. As distinguished therefrom, the hereinbefore described embodiments of the present invention have nearly full cylindrical bearing surfaces and the surfaces against which the shifting movement takes place are flat and of the maximum area possible so that the wear is very slight.

It is to be understood that the embodiments of the invention shown and described are for the purpose of illustration only and various changes may be made therein without departing from the spirit and scope of the invention as defined in the subjoined claims.

I claim:

1. A power transmission chain comprising a plurality of links, each link having a circular opening at each end thereof, and means positioned in said openings for pivotally connecting said links, said means comprising a middle flat member and two side members one positioned at each side of said middle member, the opposite sides of said middle member in contact with said side members being uninterrupted flat bearing surfaces throughout, and the side of each of said side members in contact with said middle member being an uninterrupted flat bearing surface throughout and the side in contact with said circular openings being curved bearing surfaces.

2. A power transmission chain comprising a plurality of inner links having circular openings in the ends thereof, outer links having rectangular openings in the ends thereof, flat members extending through said circular openings and said rectangular openings and secured to said outer links, a curved bearing member positioned at each side of said rectangular member and having one side corresponding to the contour of the flat member and the opposite side corresponding in contour to the circular opening.

3. A power transmission chain comprising a plurality of inner links having circular openings in the ends thereof, outer links having rectangular openings in the ends thereof disposed with the long dimensions at a slight angle from the position at right angles to the direction of movement of the chain, flat members extending through said circular openings and said rectangular openings and secured to said outer links, a curved bearing member positioned at each side of said rectangular member and having one side corresponding to the contour of the flat member and the opposite side corresponding in contour to the circular opening.

4. A three-part bearing pintle for power transmission chains of the type having links with circular openings therein comprising a middle rectangular member and two curved members one positioned at each side of said middle member, the opposite sides of said middle member in contact with said side members being uninterrupted flat bearing surfaces throughout, and each of said curved members having an uninterrupted flat bearing surface in contact with said middle member and a curved bearing surface on the opposite side thereof adapted to fit said circular openings.

5. A three-part bearing pintle for power transmission chains of the type having links with circular openings therein comprising a middle rectangular member and two curved members one positioned at each side of said middle member, the opposite sides of said middle member in contact with said side members being uninterrupted flat bearing surfaces throughout, each of said curved members having an uninterrupted flat bearing surface in contact with said middle member and a curved bearing surface on the opposite side thereof adapted to fit a circular opening, and the axial length of said middle member being a little greater than the axial length of said curved members.

6. A power transmission chain comprising a plurality of inner links, each link having a circular opening in each end thereof, a three-part bearing pintle positioned in said openings and having a middle rectangular member and having a curved member positioned at each side of said rectangular member, and outside links having a rectangular opening in each end thereof through one of which openings said middle rectangular member extends, said rectangular member being secured to said outside links and maintained in a position substantially at right angles to the line of travel of the chain.

7. In a power transmission chain of the type in which there are outside links with rectangular openings therein and inner links with circular bearing openings therein, a three-part bearing pintle comprising a middle rectangular member of a width slightly less than the diameter of said circular openings and adapted to have its ends secured in said rectangular openings, and a curved member on each side of said rectangular member of an axial length slightly less than the axial length of said middle rectangular member, each curved member having a flat side in contact with said rectangular member and having an opposite curved surface, said curved members being adapted to be positioned between said outside links with their curved surfaces in contact with the circular bearing openings in said inner links.

JOHN IVER JOHNSON.